Jan. 15, 1924.
J. R. GIDDENS, JR
1,481,130
DIRECTION VEHICLE SIGNAL
Filed Feb. 23, 1923
2 Sheets-Sheet 2
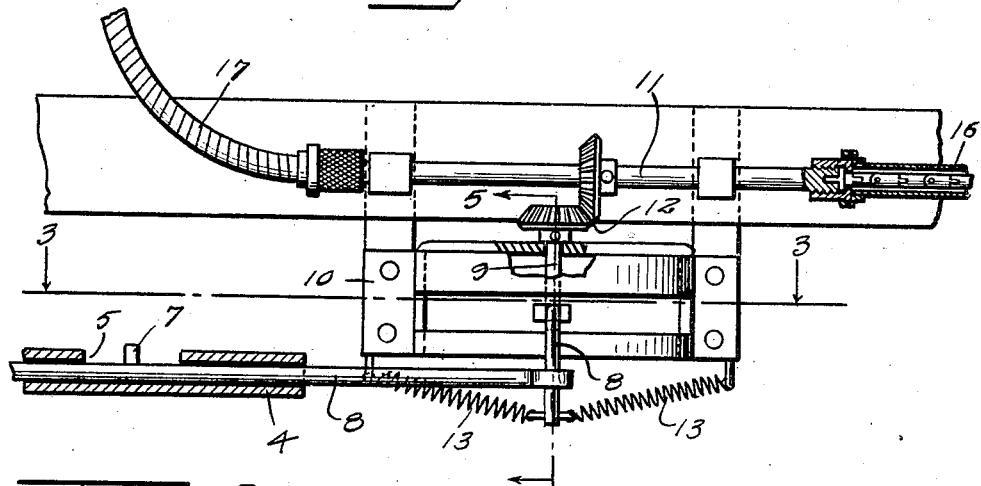
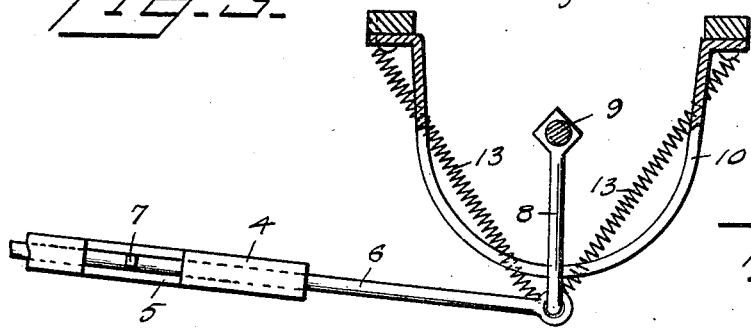
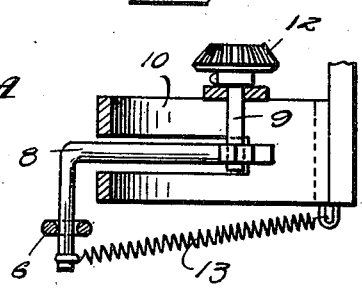
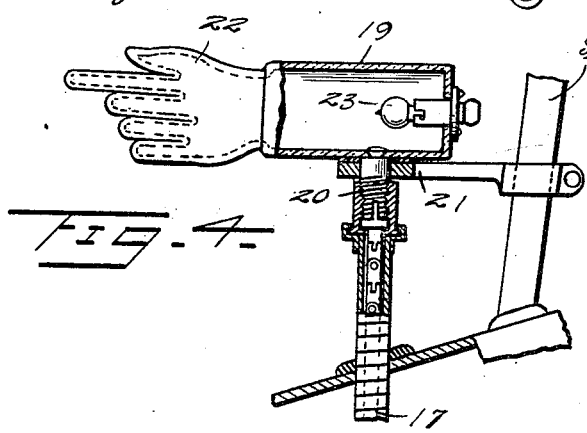
Inventor
J. R. Giddens, Jr.
By
Attorney Patented Jan. 15, 1924.

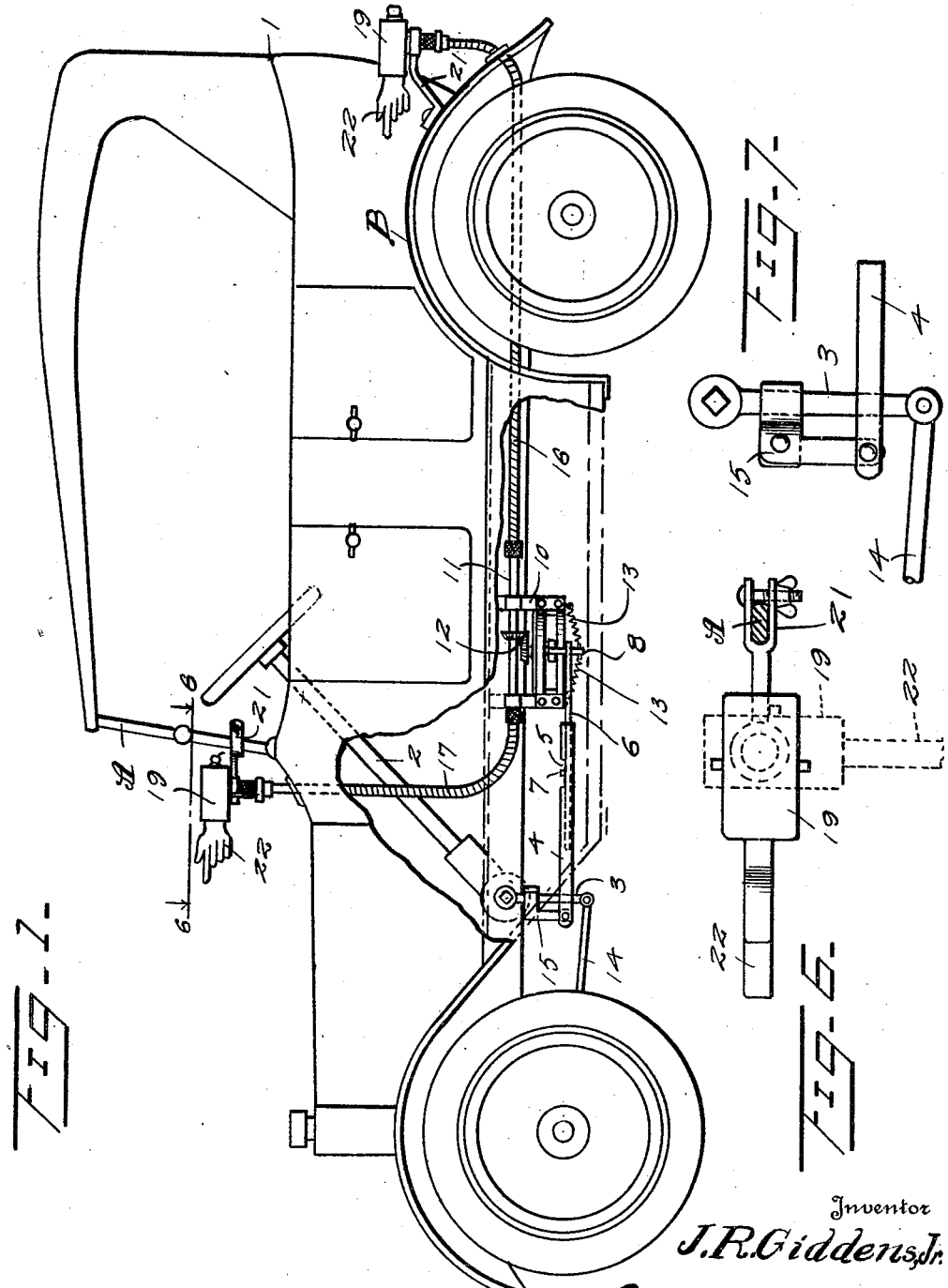

1,481,130

UNITED STATES PATENT OFFICE.

JAMES R. GIDDENS, JR., OF MOBILE, ALABAMA.

DIRECTION VEHICLE SIGNAL.

Application filed February 23, 1923. Serial No. 620,682.

*To all whom it may concern:*

Be it known that I, JAMES R. GIDDENS, Jr., a citizen of the United States, residing at Mobile, in the county of Mobile and State of Alabama, have invented certain new and useful Improvements in Direction Vehicle Signals; and I do hereby declare the following to be a full, clear, and exact description of the invention, such as will enable others skilled in the art to which it appertains to make and use the same.

This invention relates to traffic signaling means and its primary object is the provision of a signal to be applied to an automobile whereby the driver may indicate his intention when about to turn and the direction of the turn so that the driver of a following or approaching vehicle as well as pedestrians, may be timely warned and thereby obviate a casualty as well as to facilitate traffic.

The invention provides a signal of the character aforesaid which is mechanically operated and connected with the steering mechanism so as to be positively operated and indicate the direction of turn with safety and without any care on the part of the driver, since there is no extra part of any nature to be manipulated outside of the steering wheel, movement of the latter insuring a corresponding positive movement of the signal whereby to designate the course of the vehicle whether straight ahead or to the right or left.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of an automobile provided with signaling means embodying the invention, parts being broken away, Figure 2 is an enlarged detail view of a portion of the operating mechanism, Figure 3 is a sectional detail on the line 3—3 of Figure 2, Figure 4 is a sectional detail of one of the signals, Figure 5 is a sectional detail on the line 5—5 of Figure 2, Figure 6 is a sectional detail on the line 6—6 of Figure 1, and Figure 7 is a detail view of the steering arm and the parts connected thereto.

Corresponding and like parts are referred to in the following description and designated in the several views of the drawings by like reference characters.

The numeral 1 designates a motor vehicle such as an automobile which is typical of the type of vehicle for which the signal is designed. In accordance with the invention, it is proposed to provide two signal devices, the one located forwardly of the vehicle and the other at the rear thereof, both being connected for simultaneous movement and operable synchronously with the steering gear. The signal devices are substantially alike, the main difference residing in the attaching means, the one being clamped to a standard A of the windshield and the other being attached to a rear fender B. The same reference characters are employed in the subjoined description and in the attached drawings to designate corresponding parts of both signal devices.

The numeral 2 designates the usual steering rod and 3 is an arm connected with the lower portion thereof to turn therewith. A tubular rod member 4 is connected with the arm 3 and is provided in a side with a slot 5. A rod 6 is slidable in the member 4 and has a lateral extension 7 operable in the slot 5. The rear end of the rod 6 is connected with a crank arm 8 fast to a vertical shaft 9 mounted in a bracket 10 attached to the vehicle. A longitudinal shaft 11 mounted in the bracket 10 is geared to the vertical shaft 9 by bevel gearing 12. Contractile helical springs 13 disposed upon opposite sides of the crank arm 8 connect the outer end thereof with the inner end of the bracket 10, whereby to hold the crank arm 8 in neutral or predetermined position. The steering arm 3 is connected by means of a rod 14 with the arm, not shown, of a steering knuckle in a manner well understood. A clamp 15 attached to the arm 3 has pivotal connection with the tubular member 4.

A flexible shaft 16 connects the longitudinal shaft 11 with the rear signal device. A flexible shaft 17 connects the shaft 11 with the frame signal device. These flexible shafts may be of any nature and coupled to the respective parts in any preferred way.

Each signal device comprises a hollow body or casing 19 having a stem 20 to which the flexible shaft is coupled and by which the signal is mounted in a support 21 clamped to the standard A, or secured to the rear fender B, or to any convenient part of the machine. The casing 19 is provided with an indicator 22 which represents the human hand with the index finger extended. The casing 19 carrying the indicator 22 contains an electric lamp 23 which illuminates the indicator. The lamp 23 of each signal device is included in a lighting circuit which is adapted to be controlled by means of a switch (not shown) conveniently located in a manner well understood. When the steering wheels of the vehicle are in line therewith, the indicators 22 point straight ahead, but when the steering wheels are turned, the indicators 22 are correspondingly turned in the same direction, thereby designating the direction in which the vehicle is about to turn so as to give ample warning to the drivers of approaching or following vehicles. The indicators 22 are readily seen during the day, but at night they are illuminated by means of the lamps 23 which shed their rays of light thereon.

The signal devices are conspicuously located so as to be readily observed and thereby give efficient service both in promoting traffic and preventing a casualty. The direction indicating elements, such as the indicators 22, having connection with the steering mechanism move therewith without requiring any extra attention on the part of the driver and operate at all times to indicate the direction of travel of the vehicle whether straight ahead or to the left or right.

What is claimed is:

1. Traffic signal means for motor vehicles comprising similar front and rear signal devices each including a casing, a direction indicator carried by the casing, a lamp within the casing for illuminating the indicator, a crank arm having a limited sliding connection with the steering gear for movement therewith, a vertical shaft carrying the crank arm, a longitudinal shaft geared to the vertical shaft, and an independent flexible shaft connection between the longitudinal shaft and the casings of the signal devices to effect simultaneous movement thereof.

2. A traffic signal means consisting of a substantially horizontally disposed shaft, a signal operable by said shaft, a shaft disposed at an angle to said shaft and in driving relation therewith, slip-connected rods attachable at one end to said second shaft and adjacent the other end to vehicle steering gear.

3. Traffic signal means consisting of a substantially horizontally disposed shaft, a signal operable by said shaft, a bracket having portions constituting bearings for said shaft, said brackets having spaced substantially arcuate portions spanning the bearings, a shaft disposed at an angle to said shaft and in driving relation therewith and within said portions, a crank extending from the second shaft and intermediate said portions, and a driving connection between said crank and vehicle steering gear.

4. Traffic signal means consisting of a substantially horizontally disposed shaft, a signal operable by said shaft, a bracket having portions constituting bearings for said shaft, said brackets having spaced substantially arcuate portions spanning the bearings, a shaft disposed at an angle to said shaft and in driving relation therewith and within said portions, a crank extending from the second shaft and intermediate said portions, a driving connection between said crank and vehicle steering gear, consisting of slip-connected rods and a clamp to which one of said rods is pivoted being directly attachable to the steering gear.

In testimony whereof I affix my signature in presence of two witnesses.

JAMES R. GIDDENS, Jr.

Witnesses:
CHARLES OLSEN,
W. J. BODLE.